March 20, 1945. P. E. FENTON 2,371,813
METHOD OF APPLYING LAUNDRY PROOF FASTENERS
Filed March 8, 1941
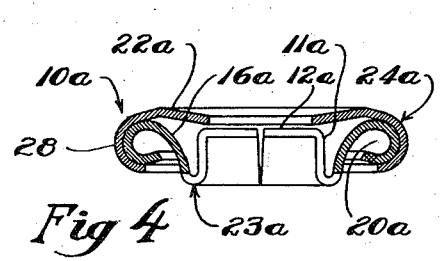
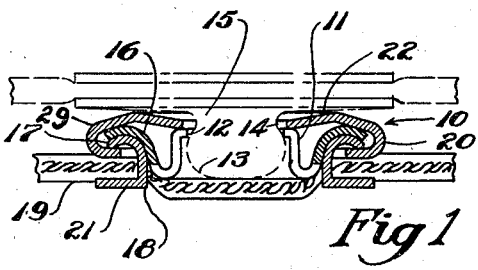
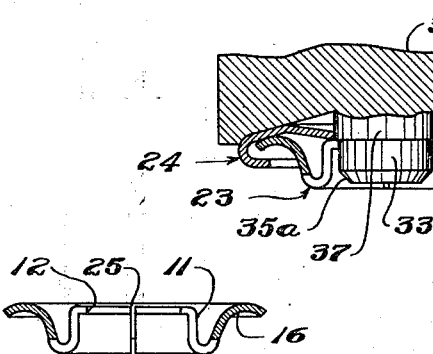
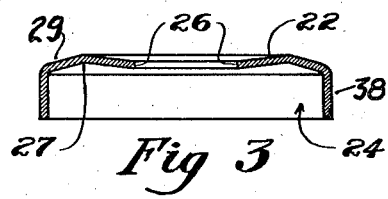
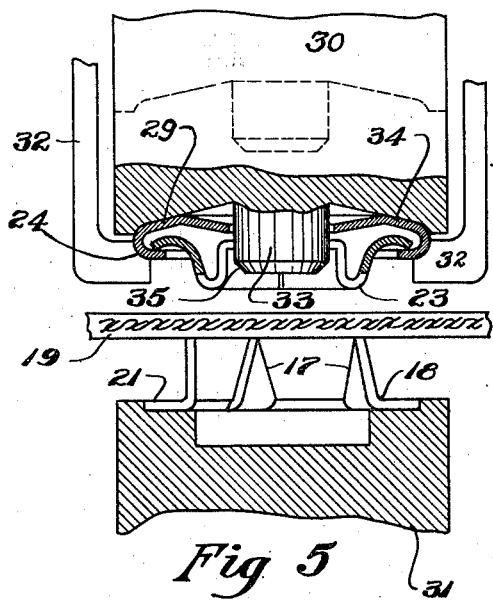
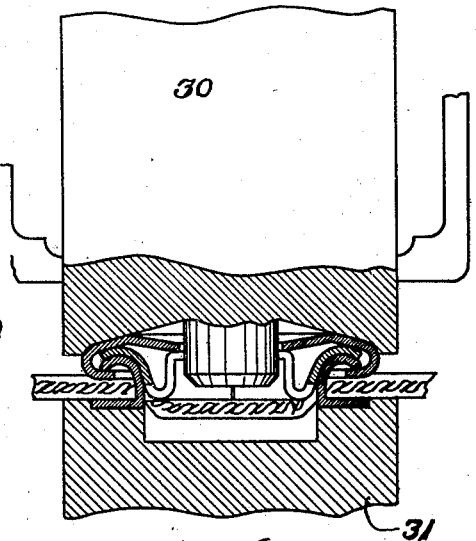
INVENTOR
PAUL E. FENTON
BY
ATTORNEY Patented Mar. 20, 1945

2,371,813

UNITED STATES PATENT OFFICE 2,371,813

METHOD OF APPLYING LAUNDRYPROOF FASTENERS

Paul E. Fenton, Middlebury, Conn., assignor to Scovill Manufacturing Company, Waterbury, Conn., a corporation of Connecticut Application March 8, 1941, Serial No. 382,317

2 Claims. (Cl. 218—29)

This invention relates to snap fastener installations and more particularly to improvements in laundry-proof socket assemblies and in a novel method for aligning the constituent parts of such assemblies in snap fastener installations.

The principal object of the invention is to provide a snap-fastener socket installation which may be embodied in very small sizes for mechanical attachment to garments or similar supporting sheets, and of which the separate parts are strong and durable enough to withstand not only the abuse of ordinary usage but also that occasioned by the laundering and ironing of the garment to which they are applied.

It is a more specific object of the invention to provide a socket assembly having a series of resilient fingers which are adapted to engage the head of a cooperating snap fastener stud, and means surrounding and partially overlying such fingers which serves to absorb all extraordinary stresses imposed upon the socket assembly, and to prevent either crushing of the fingers under axially applied forces or excessive bending of them by heavy sidewise thrusts.

It is another object of the invention to provide a laundry-proof socket assembly having its resilient stud engaging means enclosed within and shielded by a separately formed cap which is provided with a central opening of such size as to admit a properly sized stud head but to exclude any larger element, and a method for aligning the stud receiving opening in the cap with the stud engaging means, and for securing the separate parts of the assembly in aligned relation during the operation wherein it is secured to a supporting sheet.

The foregoing, as well as other objects and various features of the invention, will be more apparent from a consideration of the following description in the light of the accompanying drawing in which:

Fig. 1 is a sectional view of a snap fastener installation constructed in accordance with the invention, and secured to a supporting sheet, and further illustrates the engagement of the installation with a conventional stud member carried by another sheet;

Fig. 2 is a sectional view of one of the two elements which comprise the socket assembly;

Fig. 3 is a sectional view of the other of the component elements of the socket assembly prior to assembly on the first element shown in Fig. 2;

Fig. 4 is a sectional view illustrating another form of socket assembly embodying the principles of the invention;

Figs. 5 and 6 are side elevational views, partly in section, of a pair of setting tools, and illustrate the method of aligning the separate parts of the snap fastener socket assembly during the operation wherein it is attached to a supporting sheet; and Fig. 7 is a sectional view of a modified form of tool which may be substituted for the comparable part of Figs. 5 and 6.

Referring to the drawing and first considering Fig. 1, numeral 10 identifies generally a two-part socket assembly comprising a central circular series of resilient fingers 11 disposed generally parallel to the axis of the assembly and having inwardly directed beads 12 on their free forward ends which are adapted to cooperate with the head 13 and the contracted neck 14 of a stud member 15 such as the one shown in dotted lines; an anvil portion 16 which flares forwardly and outwardly from the rear ends of the fingers and serves with the apparatus to turn the prongs 17 of an attaching device 18 during the operation wherein the socket assembly is secured to the supporting sheet 19; a retaining ring 20 extending rearwardly and inwardly from the outer margin of the anvil with its free edge disposed in spaced relation to the rear surface of the anvil to define an entrance slot through which the prongs of the attaching device may pass and to provide an inwardly directed flange at the rear end of the socket assembly against which the supporting sheet 19 may be compressed by the opposing flange 21 of the attaching device; and a shield portion 22 overlying the anvil and serving to protect the stud engaging fingers from damaging stresses. This socket assembly is preferably assembled from two separate elements 23 and 24, the constructional details of which are best shown in Figs. 2 and 3.

The socket element 23 comprises a single piece of sheet metal which has been stamped and drawn to form the resilient stud engaging fingers 11 and their beads 12 and the surrounding anvil part 16. While the fingers may be formed only within the central and axially directed portion, it is preferred that the slits 25 which define them shall extend through the fold at the rear of the element and into the immediately adjacent part of the anvil. The effective length of the fingers is thus increased but without a comparable increase in the depth of the element 23. This factor, of course, contributes to the making of a thin socket and yet does not require any sacrifice in the resiliency of the stud engaging fingers.

The cap element 24 prior to assembly on the socket element 23 includes a rearwardly directed portion 38 from which the retaining ring 20 is formed and the shield portion 22. It may be conveniently made by stamping a piece of sheet metal to provide the annular shield portion 22 having a central opening 26 which is just large enough to permit the passage of the head of a cooperating stud element 15 therethrough, and a rearwardly directed annular ring 38 which at this stage of manufacture extends substantially concentric to the general axis of the cap 24, as shown in Fig. 3. It is preferred that the shield portion of the cap element be dished inwardly to provide a circular break 27 dividing it into an inner portion which slopes rearwardly toward the stud receiving opening 26, and an outer marginal portion 29 which slopes rearwardly toward the annular ring 38.

When the socket element 23 and the cap element 24 have been formed, as shown in Figs. 2 and 3, they may be assembled with the anvil portion 16 engaging the underside of the marginal portion 29 of the shield, and with the beaded ends of the fingers 11 facing the stud receiving opening 26. The socket assembly may then be completed by rolling or spinning the marginal flange 38 of the cap element inwardly to form the retaining ring 20.

Another two piece socket assembly embodying the invention is shown in Fig. 4. The difference between this assembly and that shown in Fig. 1 is to be found primarily in the fact that the retaining ring portion 20a is formed as a part of the socket element 23a rather than of the cap element 24a. Thus the socket element includes the resilient stud engaging fingers 11a and their beads 12a, the flaring anvil 16a, and the rearwardly and inwardly directed marginal retaining ring 20a; and the cap element 24a includes only the rearwardly dished shield portion 22a and a rim portion 28 which is rolled over the outer surface of the retaining ring to hold the two parts of the socket assembly in assembled relation.

It will be evident to those familiar with the art that the resilient fingers of these socket assemblies are comparatively long and thin and are adapted to yield readily to receive the head of a cooperating stud. Despite the fact that each of these parts is relatively delicate, the socket assemblies as wholes are of extremely rugged and durable construction. Thus, and referring particularly to Figs. 1 and 4, it will be noted that the shield portions 22 and 22a define the front surface of each of the completed socket assemblies, and expose only so much of the beaded ends of the resilient fingers as is necessary to permit of their engagement with the neck of a stud; and that the inner portion of the shield is dished rearwardly so that its inner edge lies substantially in contact with the free ends of the fingers. It therefore serves to bar entry of any element which is substantially larger than a properly-sized stud head, and accordingly to make all but impossible the accidental damaging of the fingers by the insertion of any foreign element into the socket. The shield portion further serves to absorb substantially all forces which may be applied to the socket element in a lateral direction. When, for example, the overlapping seams of a garment are pulled sidewise, as frequently happens, the stud element of the snap fastener combination applies a very heavy lateral thrust to the socket element. Except for the presence of the shield portion, this force would have to be borne entirely by the resilient fingers and might easily result in the bending of them to such an extent as to give them a permanent set and destroy their utility. In the present socket assemblies, however, the fingers can be bent only to a very slight extent before the stud engages the inner edge of the shield. Thereafter all of the stress will be absorbed by that substantially solid element, and none of it can be applied to the fingers so as to damage them. Finally the shield cooperates with the marginal parts to prevent crushing of the completed assemblies. When, for example, either of the illustrated socket assemblies is subjected to extraordinarily heavy pressure by the mangle or ironing machine in the course of laundering of the garment to which the socket assembly is attached, such pressure will all be applied to its retaining ring, anvil and shield, and to the prongs and flange of the attaching device. The more delicate resilient fingers are recessed behind these various marginal parts of the installation and the destructive force can not reach them. Accordingly, so long as the substantially solid marginal parts stand up, the central stud engaging fingers can not be harmed.

In the preferred forms of the invention which are here shown on a very much enlarged scale of approximately 5 to 1, the diameter of the opening 26 in the cap element may be only a few thousandths of an inch larger than the diameter of the opening defined by the beaded ends of the stud engaging fingers. It is evident, therefore, that the elements 23 and 24 must be very carefully and precisely aligned in order that the completed assembly may be capable of receiving and holding a stud. When the socket assembly takes the form shown in Fig. 4, the alignment must be effected during manufacture and is, of course, dependent upon precise forming of the component parts as well as upon precise assembly. In the two-piece structure of Figs. 1 to 3, however, alignment in this way is not feasible. The present invention, therefore, provides a method for aligning the elements and for holding them in aligned relation while they are being permanently secured to a supporting sheet.

Briefly this method comprises the steps of interposing a sheet of material between the rear surface of a socket assembly 10 and the prongs of an attaching device 18, of entering a centering pin into the recess defined by the beaded ends of the stud engaging fingers 11, which pin is adapted to spread the fingers to a slight extent thereby causing the socket element 23 to assume a centered position and whereby to hold that element on the pin, of then engaging the marginal and shield portions of the cap 24 with a supporting surface which is centered with respect to the pin and is so shaped as to coact with the sloping surfaces of the cap and center that element, and of then forcing the socket assembly and the attaching device towards each other to cause the prongs of the latter to penetrate the sheet, to enter the retaining ring of the assembly, and to be clinched therein whereby to secure the cap and socket elements of the assembly in the aligned relation upon the sheet.

The method may be better understood by a consideration of Figs. 5 and 6, which illustrate a pair of setting tools 30 and 31 adapted to be employed in a fastener setting machine having any conventional means for moving one or both of the tools towards each other whereby to carry out the aligning steps during the setting of the fastener upon its supporting sheet. The constructional details of the complete machine form no part of the present invention and need not be considered. While other arrangements are possible, and are frequently employed, it will be assumed, for purposes of the present description of the method, that the upper tool is reciprocated towards and away from the lower one which remains stationary.

At the start of the setting operation the tool 30 will be in the position shown in dotted lines in Fig. 5, and the supporting sheet 19 will be interposed between the socket assembly 10 which is held by the spring-pressed arms 32, and the pointed prongs 17 of the attaching device 18 which is supported on the lower setting tool 31. As the upper tool descends, its centrally located centering pin 33 passes through the opening 26 in the cap element 24, and enters the recess defined by the beaded ends of the stud engaging fingers 11 of the element 23. Preferably the lower end of the pin is tapered, as indicated at 35, so that it may enter the socket element without damaging the fingers, and the immediately adjacent part is slightly larger than the opening between the beaded ends of the fingers whereby it may spread those fingers. Accordingly, as the pin enters the element 23 it forces that element to move laterally until it reaches a centered position; and the resilient fingers, gripping the pin, hold the element in the desired centered relation during the continuance of the operation. Further downward movement brings the sloping surface 34 of the tool into contact with the complementary sloping surfaces of the marginal and shield portions of cap 24, thereby causing that cap to assume a centered position with respect to pin 33, and hence with respect to the socket element which is supported thereon. As the tool approaches its lowermost position, the assembly 10 will be stripped from the holding arms 32, and the prongs 17 of the attaching device will be forced through the sheet and into the socket assembly where they will be turned by the anvil 16 backed by the setting tool 30 and be clinched within the retaining ring 20. At the conclusion of the setting operation, as shown in Fig. 6, the socket assembly will be securely attached to the supporting sheet, and the prongs of the attaching device will serve to hold the elements 23 and 24 in the established aligned relationship. The setting tools may then be retracted to permit the sheet with the socket fastener installation attached thereto to be withdrawn.

Fig. 7 illustrates a modified form of setting tool 30a and the manner in which it serves to center the socket element 23 with respect to the cap element 24. Referring to that figure it will be noted that the lower surface of the tool is again adapted to engage the upper surface of the cap, and further, that its central pin 33a has an upper portion 37 which is of substantially the same diameter as the opening 26 in the cap. Accordingly, as the tool descends and the pin passes through the opening 26, the portion 37 fills the opening 26 and insures the centering of the cap with respect to the tool. The lower portion of the pin is constructed precisely as is the like part of the tool 30 of Figs. 5 and 6, and engages the resilient fingers 11, 12 to center the socket element 23 in the manner already described. When this tool is employed, both of the elements 23 and 24 are aligned with respect to their central parts, and any slight inaccuracy in the manufacture of the cap can not, therefore, prevent the proper alignment of the elements during the attaching operation.

It will be evident from the foregoing that the upper setting tool, whether it takes the form of Figs. 5 and 6 or that of Fig. 7, serves first to engage and center the socket element of the assembly and then the cap element, and the arrangement is such that the resilient fingers can hold the parts in aligned relation upon the tool until such time as they are firmly secured in this assembled relation by the clinching of the prongs of the attaching device within the retaining ring 20. The method thus insures perfect alignment of the two-piece socket of Figs. 1 to 3 and makes possible the commercial use of this simple and inexpensive assembly.

Since certain changes may be made in the construction of the socket element, as well as in centering the two pieces of the socket assembly, which changes have either been defined or are within the skill of the mechanic in the art, it is intended that the foregoing shall be constructed as descriptive rather than in a limiting sense.

What I claim is:

1. The method of securing to a supporting sheet in a single setting operation by means of an attaching device having a flange portion and a series of pointed upstanding prongs, a loosely pre-assembled two-piece socket assembly consisting of a socket element having a series of resilient fingers with internal stud-engaging beads at their free front ends, an anvil integrally joining the rear ends of said fingers extending forwardly and outwardly therefrom, and a cap element having an annular shield portion overlying said anvil with its central opening giving access to said fingers and a marginal flange extending rearwardly and inwardly to define a retaining ring for said socket element, which method includes the steps of supporting such an attaching device, of supporting the socket assembly, of entering a central projecting pin on a setting tool through the central opening in said shield and into the recesses defined by the stud-engaging fingers of the socket element to engage their beaded ends and to spread those fingers slightly whereby they may hold the socket assembly on the pin, of engaging the marginal portions of the cap element with a complementally shaped surface of the tool surrounding the pin whereby to axially align the cap element with respect to the socket element, of interposing the supporting sheet between the pointed ends of the prongs of such attaching device and the rear surface of the retaining ring of such a socket assembly, and then forcing said socket assembly towards said attaching device to cause the prongs of the latter to penetrate said sheet to enter said assembly, to be turned outwardly by said anvil and tool, and to be clinched within said retaining ring, and to force said retaining ring and said flange on the attaching device into contact with the opposite faces of the supporting sheet whereby to secure said socket element in aligned relation with said cap element upon said sheet.

2. The method according to claim 1, further characterized in that said cap element is supported upon a tool having a sloping marginal surface which is adapted to engage a complementally sloping marginal surface of the cap whereby to force said cap element to assume a centered position upon said tool.

PAUL E. FENTON.